United States Patent [19]

Salmeen, deceased et al.

[11] Patent Number: 4,610,743

[45] **Date of Patent: * Sep. 9, 1986**

[54] PATTERN BONDING AND CREPING OF FIBROUS SUBSTRATES TO FORM LAMINATED PRODUCTS

[75] Inventors: Nilo I. Salmeen, deceased, late of Neenah, Wis., by Lorraine J. Salmeen, representative; Bernard G. Klowak, Neenah, Wis.

[73] Assignee: James River-Norwalk, Inc., Norwalk, Conn.

[ * ] Notice: The portion of the term of this patent subsequent to Mar. 26, 2002 has been disclaimed.

[21] Appl. No.: 421,712

[22] Filed: Sep. 22, 1982

Related U.S. Application Data

[63] Continuation-in-part of Ser. No. 182,833, Aug. 29, 1980, abandoned.

[51] Int. Cl.⁴ .......................... B31F 1/12; B31F 1/14; B32B 7/14; D21H 5/24

[52] U.S. Cl. .................................... 156/183; 156/220; 156/291; 156/305; 162/112; 162/113; 264/283; 428/154

[58] Field of Search ........................ 428/288; 264/283; 156/183, 209, 219, 291, 278, 220, 277, 305; 427/288, 264, 275, 278; 118/211, 248; 493/337

[56] References Cited

U.S. PATENT DOCUMENTS

| | | | |
|---|---|---|---|
| 2,610,935 | 9/1952 | Rowe | 156/183 |
| 3,138,514 | 6/1964 | Florio | 156/291 |
| 3,214,323 | 10/1965 | Russell et al. | 156/291 |
| 3,708,366 | 1/1973 | Donnelly | 428/154 |
| 3,738,905 | 6/1973 | Thomas | 428/154 |
| 4,000,237 | 12/1976 | Roberts, Jr. | 264/136 |
| 4,057,669 | 11/1977 | McConnell | 264/283 |
| 4,125,659 | 11/1978 | Klowak et al. | 156/183 |
| 4,135,024 | 1/1979 | Callahan et al. | 427/288 |
| 4,487,796 | 12/1984 | Lloyd et al. | 428/154 |

*Primary Examiner*—Edward Kimlin
*Assistant Examiner*—Louis Falasio
*Attorney, Agent, or Firm*—Isaksen, Lathrop, Esch, Hart & Clark

[57] ABSTRACT

Two or more webs (11 and 12) of highly bulked substrate are passed into a nip formed between a gravure roller (14) and an impression roller (15). The impression roller has raised areas defining an interconnected network of lines such that the webs are compressed only under the raised areas; as a result, the binding liquid applied by the gravure roller (14) to the laminate of the two webs is absorbed substantially through the webs in the compressed areas. The gravure roller (14) may have a uniform surface, such that a light coating of binding liquid is applied to the surface of the uncompressed areas in the laminate, or the gravure roller may have a pattern of etched grooves or cells which matches and registers with the pattern of raised areas on the impression roller. In the latter embodiment, binding liquid will be absorbed into the laminate only in the compressed areas. The coated laminate (21) is applied to the surface (24) of a creping cylinder (25), is dried thereon, and is creped off with a creping blade (27) to form a laminated product bound together by an interconnected network of lines of strength extending through the laminate. The areas between the lines of strength are not compressed and are not substantially coated with binding liquid, and thereby retain high bulk and absorbency. In a modified embodiment of the invention, a single impression/pressure roller and raised areas thereon is used to join and press the webs against a gravure roller and to apply the webs to a creping cylinder; and in a second modified embodiment, the web laminate is pressed and coated on one side, is substantially hot air dried without compression, is coated with binding liquid applied to the outer side, and is then applied to the creped from a creping cylinder.

22 Claims, 10 Drawing Figures

PATTERN BONDING AND CREPING OF FIBROUS SUBSTRATES TO FORM LAMINATED PRODUCTS

This application is a continuation in part of prior application Ser. No. 182,833, filed Aug. 29, now abandoned.

TECHNICAL FIELD

This invention relates generally to the field of paper making and converting, and particularly to processes and apparatus for bonding together multiple webs of paper to form products suitable for use as towels and tissues.

BACKGROUND ART

Paper products that are used for toweling and some types of tissues have several preferred but sometimes conflicting characteristics. For example, the products should have good bulk, a soft feel, and high absorbency of both water and oily liquids; yet the products should also have good tensile strength even while wet and resistance to "linting" of fibers from the toweling when rubbed. Processes that have aimed at achieving these objectives usually have utilized an initial substrate web of fibers which is formed with low internal bonding, such as is obtained from air laying or through-air-drying paper making processes, and have applied a wet strength binder to one or both sides of the web to provide the necessary tensile strength and resistance to linting. The liquid binder is customarily applied by passing the web through a nip between a gravure roller, which picks up the liquid binder, and a back-up or impression roller. Because of the pressure placed on the web at this nip and the migration of the binding liquid through the fibers of the web, the application of adhesive in this manner tends to result in an overall compaction and strengthening of the web.

One approach to reducing the strengthening effect is the use of a patterned gravure roller, as shown, e.g., in Roberts, Jr. U.S. Pat. No. 4,000,237, in which binding liquid is applied to the web over only a portion of the web surface. In this type of process, the web with binding liquid thereon is applied to a creping cylinder—with the binder acting as a creping adhesive—and is creped off to yield a product having a creping pattern which generally matches the pattern of binding liquid application. An overall compaction of the web still takes place at the nip between the gravure and back-up rollers and at the nip formed between the pressure roller and the surface of the creping cylinder.

Creping patterns may also be formed in the web by utilizing a patterned roller which presses an adhesive coated web against the creping cylinder, as shown in Klowak, et al., U.S. Pat. No. 4,125,659. The application of creping liquid to the web is uniform, and any additional strenthening of the web results only from the compaction of the web under the patterned roller.

Greater bulk and absorbency may be obtained in a laminate web of two or more plies than in a single layer web of equivalent size and weight. Multiple ply products can have greater absorbency than equivalent weights of single ply products because the small voids left between the plies are capable of absorbing and holding substantial quantities of liquid by capillary action. Bonding of multiple plies is usually carried out in straightforward fashion by applying a binding liquid to one or more of the plies and then pressing the plies together in a nip between two calendar rolls. The resulting product is again compressed over its entire area which thus tends to reduce its potential bulk, absorbency, and softness.

DISCLOSURE OF THE INVENTION

The product of the present invention is a multiple ply tissue or towel type product composed of two or more highly bulked base substrates which are combined together in a manner which maximizes the retention of the bulk and absorbency characteristics of the original substrates. The desired level of tensile strength and bonding between the plies is provided by an interconnected network of areas in the laminate which have a high concentration of binder in them and which are highly compressed. Substantial areas of the laminate product are left uncompressed and highly bulked with very little binder in them except for a light coating at the surface if desired to inhibit linting of fibers; these highly bulked areas serve to provide exceptional liquid absorbency for the product as a whole. The laminate thus combines the desirable properties of high tensile strength, good bonding between plies, resistance to linting at the surfaces if a surface coating of binder is applied, a soft, bulky feel as perceived by the consumer, and excellent absorbency.

In a process of the invention, two or more dry webs of highly bulked substrates are passed into a nip formed between a gravure roller and a back-up or impression roller to form a laminate. The gravure roller may have a uniform pattern of engraved lines on its surface to pick up the binding liquid and apply it in a uniform pattern on one surface of one of the webs. The impression roller has raised areas defining an interconnected network which press the portions of the laminate under the raised areas firmly against the surface of the gravure roller, while the isolated areas of the impression roller between the raised areas are depressed a distance greater than the thickness of the substrate webs combined in the laminate and thus leave the areas of the laminate thereunder substantially uncompressed. The pressure applied by the raised surfaces causes binding liquid to be dispersed deeply into the compressed areas of the laminate while the uncompressed areas receive a very light coating of binder which does not penetrate substantially beyond the surface fibers. The compressed areas of the laminate are thus greatly strengthened because of increased hydrogen bonding naturally occurring between the compacted fibers and because of the concentration of binder in the fibers which is insolubilized after curing.

After pickup of the binding liquid, the laminate is applied to the surface of a heated drier cylinder for drying, and is then creped off with a creping blade. The binding liquid on the surface of the web laminate also serves as a creping adhesive, providing sufficient adhesion between the laminate and the drier surface to allow the desired creping action at the creping blade. The creping of the laminate tends to separate the plies in the uncompressed areas as well as fluffing up the fibers in these areas.

The web laminate may be passed through the identical process once again, with the binding liquid being applied this time to the opposite surface of the laminate; the laminate is then applied to another drier cylinder, creped off, calendered if desired, hot air flotation dried to cure the binder, and rewound for later use.

It is generally desirable to avoid overall compaction of the web laminate during the aforementioned processing steps. Where a pressure roller is used to apply the web firmly against the drier surface, the pressure roller preferably also has raised surfaces defining an interconnected network which leaves depressed areas which do not compress the web. In this manner, even though portions of the laminate will be very firmly compressed during processing, a substantial area of the laminate will have undergone very little or no compression and will therefore allow the overall finished product to retain the desired characteristics of softness, bulk and absorbency.

By bonding the base webs and creping in the manner described above, the laminated product obtained has substantially greater bulk, as manifested in measured caliper, and greater total water holding capacity than the sum of these characteristics for the individual base substrates.

In an alternative preferred embodiment, the percentage of the area of the laminate that is compressed may be reduced further by utilizing a combination impression/pressure roller, mounted against the drier cylinder, which has a raised pattern on its surface and which also acts as the back-up roller for the gravure roller that applies the binding liquid to the webs. The two webs are fed into the nip formed between the impression roller and the gravure roller, and the areas of the laminated web that are compressed by the raised areas on the impression roller remain in registry with these raised areas as the roller rotates into contact with the surface of the drier. The once-pressed areas of the laminate are pressed again at the nip between the impression/pressure roller and the drier cylinder, and the areas of the laminate between the raised areas on the roller are never compressed at all since they always remain in registry with the depressed areas on the roller. The interconnected network of compressed areas in the laminate provides tensile strength to the laminate as a whole, and the binding liquid may be applied over the entire surface of the laminate to act as a creping adhesive on the drier. After the first creping, the laminate may be passed through the process again with the other side of the laminate having binding liquid applied thereto.

The process of the invention may also be carried out by eliminating the first creping step and replacing it with the step of passing the laminated webs, with binding liquid on one surface, through an air flotation drier to dry the laminate without pressing it. The drying step may also be performed by applying the laminate to a drying cylinder without pressing. After the binding liquid has been dried on the one surface of the web, the web laminate is passed through a second gravure station to apply binding liquid to its other surface, in the manner described above, and is then transferred to a heated drier cylinder from which it is creped.

The process as described above may utilize application of binding liquid to one side of the web laminate from a uniformly engraved gravure roller, so that binding liquid is absorbed deeply into the product where it is compressed by the raised areas on the impression roller while the remainder of the product receives a light, surface coating of binding liquid. Alternatively, the gravure roller may have a recessed pattern of grooves, cells or engraved lines which underlies and registers with the raised area pattern on the impression roller so that binding liquid is absorbed into the product in a pattern. Thus, surface areas of the product between the pressed pattern areas would be free of binding liquid.

Further objects, features and advantages of the invention will be apparent from the following detailed description taken in conjunction with the accompanying drawings showing preferred embodiments of the invention.

BEST MODE FOR CARRYING OUT THE INVENTION

Figure 1:
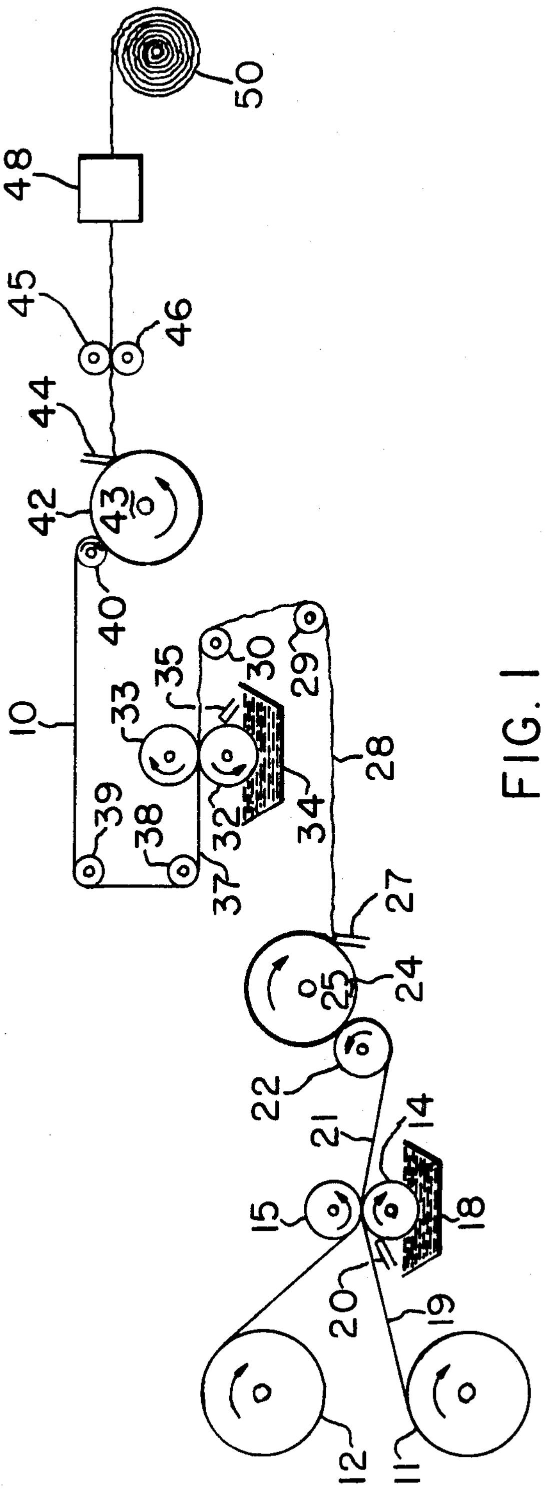
FIG. 1 is a somewhat simplified schematic view of a continuous web laminating apparatus in accordance with the invention.

With reference to the drawings, a schematic view of apparatus for continuously combining a pair of webs into a laminate product in accordance with the invention is shown generally at 10 in FIG. 1. Rolls 11 and 12 of base substrate are unrolled and the webs passed into a nip formed between a gravure roller 14 and a back-up or impression roller 15. The base substrate material from the rolls 11 and 12 is preferably a high absorbency, low density web having low internal fiber bonding. Such webs can be produced by various conventional processes, such as through-air-drying, air laying, and other processes which produce products having similar characteristics. The present process has the singular advantage of producing a laminate which retains a substantial portion of the bulk and absorbency of such initial base substrates, and can provide a product in which some of these characteristics in the final product are better than a combination of the characteristics of the individual base substrates taken separately. For reasons described further below, the total water holding capacity of the laminate is actually higher than the sum of the water holding capacities of the individual webs. In general, it is preferred that the starting webs have very little internal cohesion, and commensurate high bulk and absorbency, since the product formed in accordance with the present process adds sufficient tensile strength to yield a satisfactory product.

The gravure roller 14 of FIG. 1 has a surface which is engraved with lines and which picks up the binding liquid from a pan 18 and delivers it to the outer surface 19 of the web 11. A doctor blade 20 is used in the customary fashion to remove excess liquid from the surface of the gravure roller.

After having the binding liquid applied to one surface, the laminate 21 of the two webs 11 and 12 is passed around a pressure roller 22 and into contact with the polished, heated surface 24 of a drying/creping cylinder 25. As the moistened web laminate drys on the cylinder surface, it develops adhesion thereto, which allows the web to be creped from the cylinder surface by a creping blade 27. The creped laminate 28 may then be rewound for further processing, or, as shown in FIG. 1, the laminate may be passed around support rollers 29 and 30 and thence into a nip formed between a second gravure roller 32 and a second impression roller 33. The gravure roller 32 receives binding liquid from a pan 34, has its surface wiped by a doctor blade 35, and delivers the binding liquid into contact with the side 37 of the laminate 28 which is opposite to the side 19 which had previously received a coating of creping liquid. The wetted laminate is then passed around support rollers 38 and 39 to a pressure roller 40 which applies the laminate, moistened side down, against the surface 42 of a second drying/creping cylinder 43. The dried web is creped from the surface of the cylinder 43 by a creping blade 44, is passed through the nip formed between two calender rollers 45 and 46, which lightly press the creped web, is thence passed through a curing station 48 which applies heat to the web to heat cure and cross-link the binder material, and is wound up onto a roll 50 to await further processing.

Figure 2:
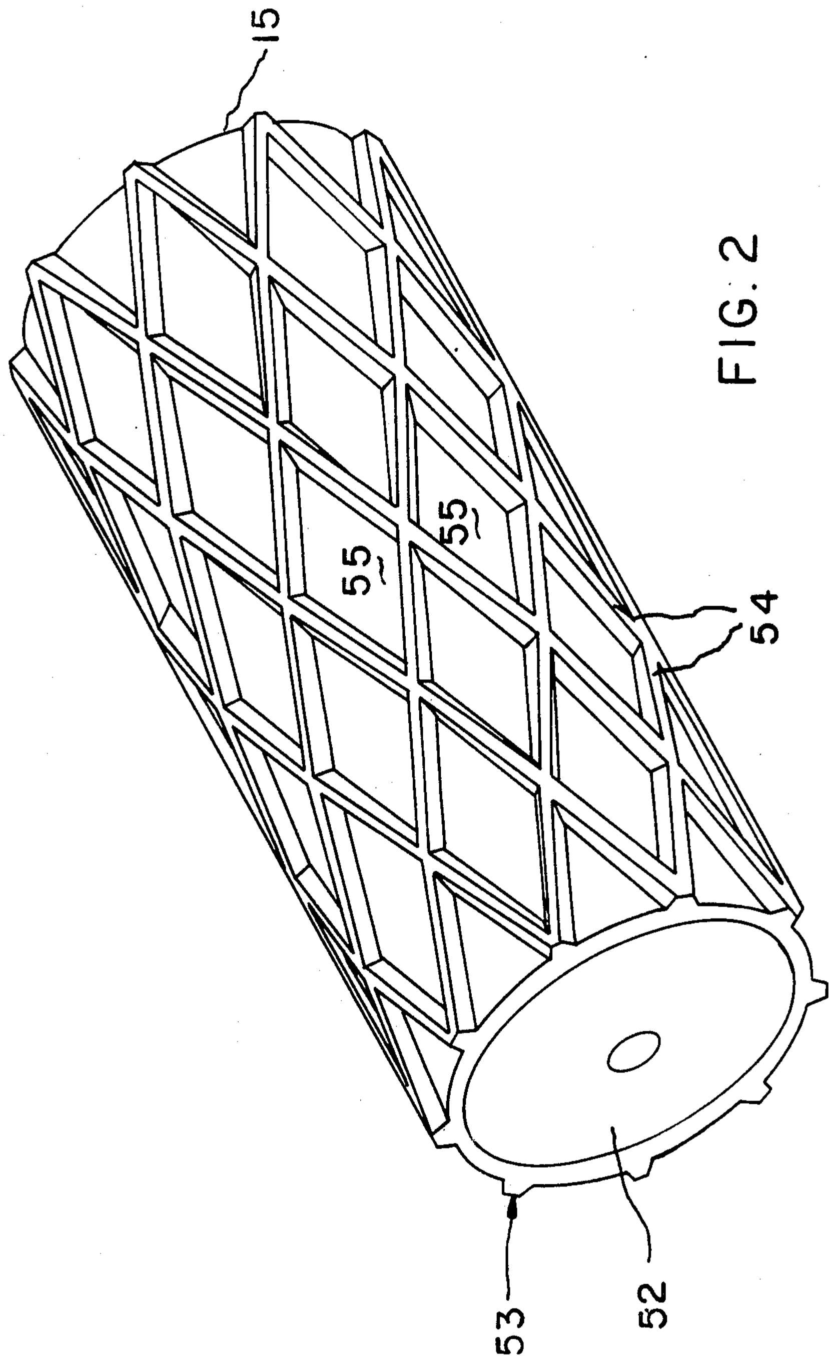
FIG. 2 is a stylized isometric view of a pressure or impression roller in accordance with the invention having raised surfaces defining an interconnecting rectilinear network.

The impression roller 15 is shown in more detail in the view of FIG. 2. This roller has a central metal core 52 with a resilient rubber sheet or blanket 53 mounted on its surface. The resilient sheet is formed with raised surface areas 54 forming linear bands which interconnect with each other and define a rectilinear network which surrounds and separates depressed areas 55 on the impression roll surface. The height of the raised areas 54 above the depressed areas 55 is preferably selected to be greater than the uncompressed thickness of the two webs 11 and 12 which are being bonded at the nip between the rollers 14 and 15. It should be understood that the dimensions of the spacing between the raised areas 54 relative to the overall size of the roller 15 is shown greatly exaggerated in FIG. 2 for purposes of illustration. In practice, the width of the depressed areas 55 would be in the range of 3 to 12 millimeters and the width of the raised surface bands 54 would be approximately 0.5 to 1.5 millimeters.

Figure 6:
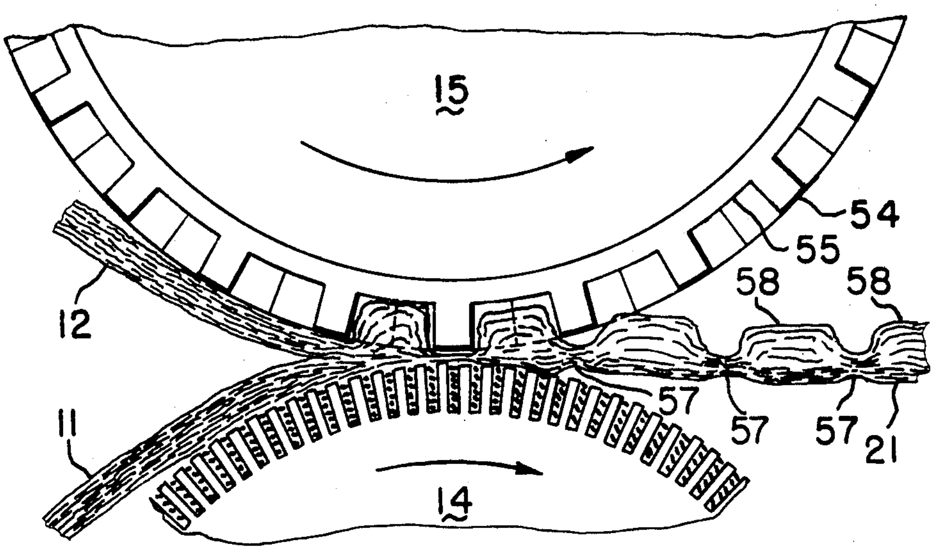
FIG. 6 is a more detailed view of the application of binding liquid to the web laminate as accomplished in the apparatus of FIG. 1 or the apparatus of FIG. 7.

A side view of the nip between the gravure roller 14 and the back-up roller 15 is shown in greater detail in FIG. 6. As illustrated therein, the raised areas 54 press the underlying portions of the two webs 11 and 12 firmly against the surface of the gravure roller 14. At these areas of firm pressing 57 there is substantial pick up of binding liquid from the gravure roller which migrates substantially through both of the webs 11 and 12 toward the raised surfaces 54. Preferably, however, the pressure applied by the impression roller is adjusted to suit the rheology of the binding liquid so that the liquid does not pass all the way through the laminate and accumulate on the raised surfaces 54. The gravure roller surface illustrated in FIG. 6 has a multitude of depressions such as engraved lines or cells uniformly distributed over the surface of the roller which act as reservoirs for binding liquid; thus, a greater quantity of liquid per unit area will be absorbed by those areas 57 of the laminate that are firmly pressed against the gravure roller surface than will be absorbed by areas of the laminate that are only lightly pressed. The combination of fiber compaction and heavy pick-up of binding liquid causes the areas 57 to be areas of high strength and high density. The areas 57 have the same general pattern as the raised areas 54 on the impression roller—that is, an interconnected rectilinear network spreading throughout the laminate. In between the densified areas 57 are larger areas 58 which underlie the depressed areas 55 in the impression roller and therefore retain a substantially uncompressed and bulky cross-section, as illustrated in FIG. 6. After curing of the binding liquid, the densified areas 57 provide a two-dimensional network of lines of strength extending throughout the laminated web which gives the web the desired tensile strength in both the machine and cross directions. In addition, the two webs 11 and 12 are attached together at the densified areas 57 because the binding liquid has penetrated substantially through both webs and can thereby bond together the adjacent fibers in each web at these areas. In between the densified areas 57 there is no substantial penetration of binding liquid, and thus the two layers can remain separated, leaving voids between them which will readily absorb and hold both water and oil by capillary action.

The impression roller 33 and gravure roller 32 are preferably constructed identically to and function in a similar manner to the impression roller 15 and gravure roller 14, respectively. The only difference in function and result between the respective rollers is that the gravure roller 32 applies a coating of binding liquid to the side of the laminated web which is opposite to the side which had binding liquid applied to it by the gravure roller 14. In addition, the raised areas on the impression roller 33 almost certainly will not coincide with the densified areas 57 produced by the first impression roller 15. Rather, the raised areas on the impression roller 33 may be expected to be in random alignment with regard to the densified areas 57 and the bulked areas 58, so that a second network of densified areas will be formed in the web which partially overlaps the original densified areas 57 and also partially overlaps, and thereby densifies, portions of the original bulked up areas 58. The resulting cured, laminated web will thus have at least two superimposed networks of lines of strength with, however, bulked up areas remaining between them.

The creping of the laminate on the creping cylinders 25 and 43 serves to partially restore some of the bulk and softness which are lost when the binding liquid is applied to the web. In particular, the creping helps to separate the two plies in the laminated product in those areas which have not been densified by pressing with the raised surfaces on the impression rollers 15 and 33.

A pressure roller, such as the roller 22, is conventionally used to press a web against the surface of the drier cylinder to cause proper adhesion. A plain pressure roller 22 having a soft, resilient surface may be utilized to press the web against the surface, but it is preferable in the present process that the pressure be minimized so that there is not firm overall compaction of the fibers of the web at the nip formed between the pressure roller and the drier surface. The laminated web may alternatively be laid upon the drier surface without the use of direct contact by a pressure roller, in the manner shown in the Klowak, et al. U.S. Pat. No. 4,125,659. In a preferred embodiment of the present invention, the pressure roller 22 also is formed with raised pattern surfaces defining an interconnected network surrounding depressed areas, with the raised portions being higher than the thickness of the laminated web. The pressure roller 40 is also preferably formed in this manner.

In contrast to the effect on the laminated web resulting from the pressure applied by the raised areas of the pattern rollers 15 and 33, the pressure applied on the web by the raised areas on the pressure rollers 22 and 40 does not cause an increase in pickup of binding liquid, although the portions of the web being compressed may show a slight increase in the relative migration of binding liquid from the surface of the web to the interior fibers. However, the amount of binding liquid which can migrate into the web will be relatively small since the areas 58 which have not been compressed against the gravure roller will have picked up only a very light coating of binding liquid.

Some additional densification of the laminated web will take place under the raised pattern in the pressure rollers because the pattern on these rollers will not necessarily coincide with the densified areas 57 produced at the nip between the impression roller and the gravure roller. The amount of overlap between the raised areas on the pressure rollers and the raised areas on the impression rollers may be expected to be random, so that a portion of the areas left uncompressed by the impression roller, such as the areas 58 shown in FIG. 6, will be compressed and thus strengthened. However, there will still remain areas within the web which are not compressed at all.

The main effect of the patterned pressure roller 22 (and similarly, of the patterned pressure roller 40) is to provide areas of strong and weak adhesion of the web to the surface of the drier cylinder, which areas correspond, respectively, to those portions of the web which are pressed by the raised pattern on the pressure roller and those portions of the web which are not so pressed. The pattern differential in pressure results, after creping of the web by the creping blade 27, in a laminated web which has a superimposed creping pattern in it, concentrated in the side of the laminate facing the drier surface, corresponding to the pattern of the pressure roller 22. As described in the aforesaid U.S. Pat. No. 4,125,659, the pattern in the creped web comprises alternating areas of very fine, dense crepes corresponding to the high adhesion areas of the web and areas of broad, widely spaced crepes corresponding to the low adhesion areas of the web. A similar patterned creping action, concentrated on the opposite side of the laminated web, occurs at the drier cylinder 43 as the laminated web is creped off by the creping blade 44.

An additional creping pattern is formed in the laminate because of the concentration of binding liquid in the compressed areas of the laminate. The areas of higher concentration of binding liquid/creping adhesive are more strongly adhered to the creping surface and a finer crepe occurs in these areas.

Figure 4:
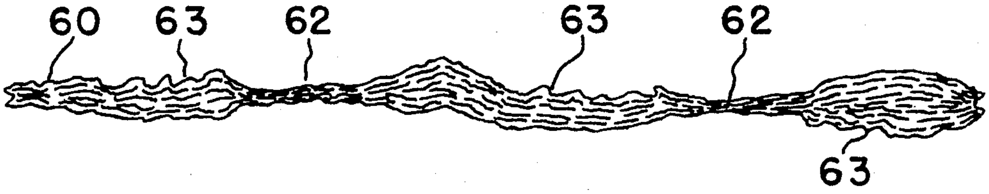
FIG. 4 is a representation of a cross-section of paper web laminated produced in accordance with the invention.

The result of these several operations is a very complex multiple layer paper web. An illustrative cross-sectional representation of an example of such a laminated web is shown at 60 in FIG. 4. The laminated product has superimposed rectilinear networks corresponding to the compression patterns provided by the impression rollers 15 and 33, in which the fibers of the web are firmly compressed and binding liquid has been dispersed into the web to bond the two layers together. The densest areas of the laminate are those which have been pressed by the impression rollers 15 and 33 and by the pressure roller 22 and/or by the pressure roller 40. Such dense areas are labeled 62 in FIG. 4; these areas also show a fine crepe resulting from the higher concentration of binding liquid therein. Areas of intermediate density and creping exist at those portions of the laminate which have been pressed only by the impression roller 15 and/or the impression roller 33. There are also superimposed areas of the web which have been pressed only by the pressure rollers 22 and 40 and which therefore have a denser crepe and somewhat greater fiber compaction than the remaining areas of the web which have not been compressed at all. These areas of intermediate creping/density are illustrated generally at 63 in FIG. 4.

It will be appreciated that the various patterns formed in the web—specifically: (1) the highly compressed, highly bonded, finely creped rectilinear network corresponding to the pattern on the impression roller 15, (2) the highly compressed, highly bonded, finely creped rectilinear network corresponding to the pattern on the impression roller 33, (3) the densely creped rectilinear network corresponding to the pattern on the pressure roller 22, and (4) the densely creped network corresponding to the pattern on the pressure roller 40—will all overlap one another in a random manner. Based on the assumption that the relative alignment of the raised patterned surfaces between any two of the various rollers referred to above is an independent random variable having a uniform probability distribution, the expected values of the fractional areas which are subjected to various amounts of pressing are given in the table below.

| | Raised Area-Fraction | Fractional Areas Subjected to: Single Press | Double Press | Triple Press | Quadruple Press | Total Area Pressed |
|---|---|---|---|---|---|---|
| 1st Pressing | $F_1$ | $S_1 = F_1$ | $D_1 = 0$ | $R_1 = 0$ | $Q_1 = 0$ | $T_1 = F_1$ |
| 2nd Pressing | $F_2$ | $S_2 = F_1 + F_2 - 2F_1F_2$ | $D_2 = F_1F_2$ | $R_2 = 0$ | $Q_2 = 0$ | $T_2 = T_1 + F_2(1 - T_1)$ |
| 3rd Pressing | $F_3$ | $S_3 = S_2 + F_3(1 - S_2 - T_2)$ | $D_3 = D_2 + F_3(S_2 - D_2)$ | $R_3 = D_2F_3$ | $Q_3 = 0$ | $T_3 = T_2 + F_3(1 - T_2)$ |
| 4th Pressing | $F_4$ | $S_4 = S_3 + F_4(1 - S_3 - T_3)$ | $D_4 = D_3 + F_4(S_3 - D_3)$ | $R_4 = R_3 + F_4(D_3 - R_3)$ | $Q_4 = R_3F_4$ | $T_4 = T_3 + F_4(1 - T_3)$ |

Thus, it is expected that some portion of the laminated web will always remain unpressed, even after four pressings. For example, if each roller has a raised areas comprising 30% of its surface, the expected area of the laminate pressed at least once after four pressings will encompass 76% of the area of the laminate, leaving 24% unpressed.

In addition to the various patterns that are formed in the final product, the light, uniform coating of binding liquid applied to each surface of the web in those areas not compacted by the raised patterns on the impression rollers hardens, upon curing, to form a thin layer of bonded fibers. Because the binding liquid does not migrate into the interior of the laminated webs at these areas, the inner fibers are loosely bonded together only by natural hydrogen bonding, if bonded together at all. As a result, the surface of the laminated product exhibits very good resistance to linting—that is, a loss of fibers while being rubbed—but the interior of the web still retains excellent water absorbency because the fibers in the interior are relatively widely dispersed and allow room for significant amounts of water to be absorbed by capillary action.

Figure 3:
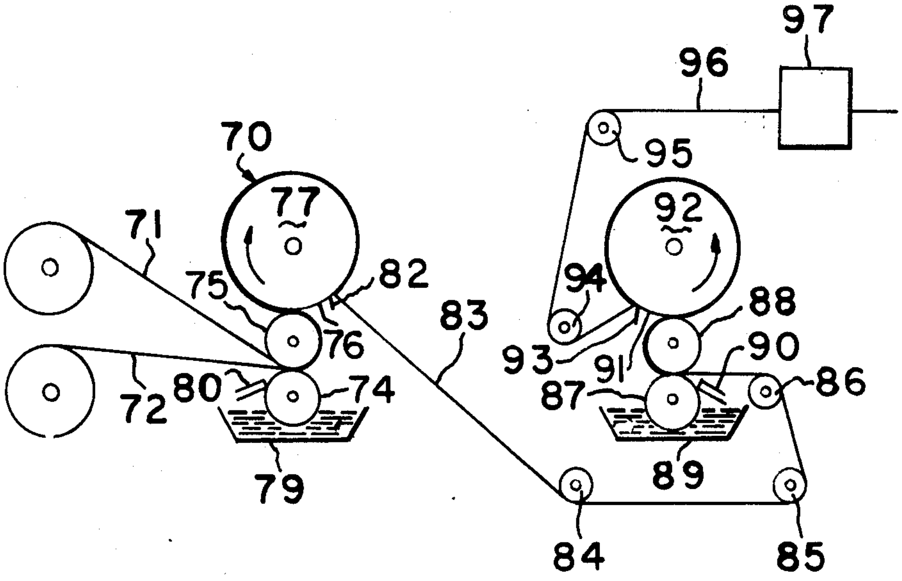
FIG. 3 is a simplified schematic view of an alternative embodiment of a continuous web laminating apparatus in accordance with the invention.

Another embodiment of apparatus for forming laminated webs in accordance with the invention is shown generally at 70 in FIG. 3. At least two webs 71 and 72, preferably highly bulked and debonded base substrate, are unrolled and passed into a nip formed between a gravure roller 74 and a combination impression and pressure roller 75. The laminated web is passed around the roller 75 and into pressure contact with the surface 76 of a heated drier cylinder 77. Binding liquid is supplied from a pan 79 to the surface of the gravure roller 74 which is wiped by a doctor blade 80. The gravure roller offers binding liquid to the surface of the laminated web which it contacts.

The drying of the binding liquid while on the surface of the heated drier cylinder 77 causes the laminated web to adhere thereto and allows the web to be creped from the surface of the cylinder by a creping blade 82. The laminated web 83 is then passed over supporting rollers 84, 85, and 86 to a nip formed between a second gravure roller 87 and a second combination impression and pressure roller 88. The gravure roller 87 picks up binding liquid from a pan 89 and has its surface wiped by another doctor blade 90 so as to offer a surface coating of binding liquid as it meets the side of the web 83 opposite to the side which had binding liquid applied thereto by the gravure roller 74. The laminated web is passed around the roller 88 into contact with the surface 91 of a second drier cylinder 92, to which it adheres as the binding liquid dries, and is creped off the surface of the drier cylinder by a creping blade 93. The resulting creped web 96 is then passed around return rollers 94 and 95 and delivered through a heat curing station 97 to a roll (not shown) or to subsequent converting operations.

Figure 5:
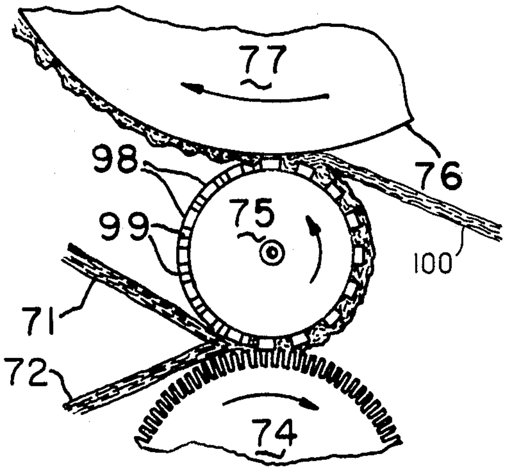
FIG. 5 is a more detailed view of the application of binding liquid to the web laminate in the apparatus of FIG. 3.

The two sets each of gravure rollers 74 and 87, pressure/impression rollers 75 and 88, and drier cylinders 77 and 92 function similarly to one another, although the details of construction may be varied. The action of these components may be illustrated with reference to the somewhat more detailed view of FIG. 5, showing the gravure roller 74, pressure/impression roller 75 and creping cylinder 77. The impression roller 75 is preferably formed in a manner identical to the impression roller 15 shown in FIG. 2, having raised areas 98 which define an interconnected rectilinear network and depressed areas 99 which are spaced below the raised areas a distance which is preferably greater than the uncompressed thickness of the two webs 71 and 72 combined . At the nip between the rollers 74 and 75, the combined webs 71 and 72 are pressed firmly together and against the surface of the gravure roller 74 under the raised areas 98, causing compression of the fibers and substantial penetration of binding liquid into these fibers. The areas of the web between those areas pressed by the raised surfaces 98 are substantially uncompressed and, since they have only a light contact with the surface of the gravure roller, they pick up only a very light coating of binding liquid if the gravure roller surface is uniformly engraved.

The resulting compression of the web is similar to that occuring at the nip between the rollers 14 and 15, as described above, with the exception that the laminated web moves around the impression roller 75 such that the compressed areas of the web remain in registry with the raised surfaces 98 until the web contacts the surface 76 of the drier cylinder. At this point, the once compressed areas of the web are again pressed by the raised surface, this time against the surface of the drying cylinder; and this second pressing results in compaction of the web and adhesion to the drying clyinder at these areas which is much greater than the compaction and adhesion at the remaining areas of the web. The greater adhesion to the drier cylinder surface occurs because of the pressure applied by the raised surfaces against the web and because the amount of binding liquid picked up by the laminate under the raised surfaces is greater than that picked up in other areas of the laminate. When the web laminate is creped from the drier cylinder surface, the creped laminate will have an interconnected network of lines of strength therein, corresponding to the areas compressed by the raised surfaces on the roller 75, and, in addition, a differential crepe composed of vey fine crepes occurring in the compressed areas and very course crepes or no crepes at all occurring in the uncompressed areas.

Another ply may be added to the laminate by feeding another base web 100 into the nip between the roller 75 and the drier cylinder 77. Bonding will occur as liquid in and on the web 72 migrates under pressure into the web 100. Creping of the laminate may be obtained by applying a separate creping adhesive to either the web 100 or the creping cylinder surface 76.

When the once creped web 83 is passed through the nip between the rollers 87 and 88 and is creped off of the drier cylinder 92, the resulting laminated product will show two superimposed networks of lines of strength and two superimposed patterns of differential creping coinciding with the lines of strength in the laminated web, with fine crepes occurring at or adjacent to the lines of strength in the web and course crepes or no crepes at all occurring in the uncompressed areas between the lines of strength. The position of the impressions applied by the roller 75 into the laminated web will generally not coincide with the impressions applied by the roller 88—the position of the paper web with respect to the patterns on these rollers cannot be practicably synchronized even if desired—so that the two superimposed networks of compressed areas will be randomly aligned.

Figure 7:
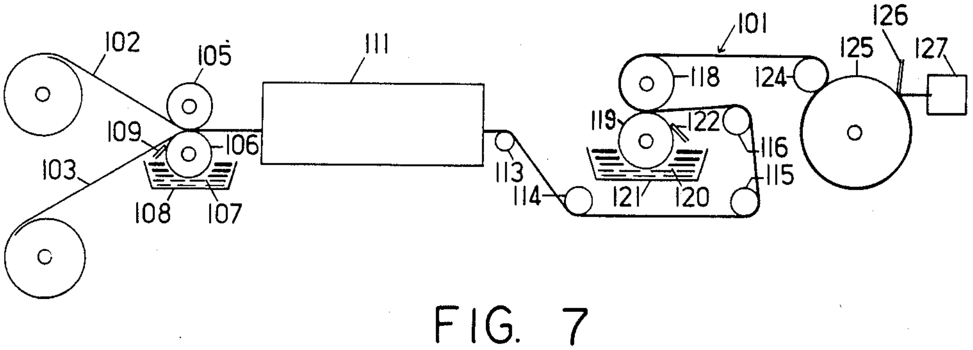
FIG. 7 is a schematic view of another alternative embodiment for continuously laminating multiple webs in accordance with the invention.

Another apparatus for producing laminated webs in accordance with the invention is shown generally at 101 in FIG. 7. In this apparatus, two webs 102 and 103 are unwound from rolls and passed through a nip between an impression roller 105 and a gravure roller 106 which picks up binding liquid 107 from a pan 108 and has its surface wiped by a doctor blade 109. The resulting laminated web 110 is dried without pressing, preferably by being passed through a flotation drier 111 in which heated air thoroughly dries the binding liquid in the web. Alternatively, the web could be dried by applying it to a drier cylinder without the use of a pressure roller. The dry web from the flotation drier moves over support rollers 113, 114, 115, and 116 to a nip formed between a second impression roller 118 and a second gravure roller 119. The gravure roller picks up binding liquid 120 from a pan 121 and is wiped by a doctor blade 122 so that a layer of binding liquid is left on the gravure roller surface. After pick up of binding liquid, the web moves to a nip between a pressure roller 124 and a second drier cylinder 125 which is heated to dry the web and allow it to be creped from the drier surface by a creping blade 126. The creped web is then passed through a curing station 127 to set the binding liquid and render it water insoluble, and the resulting web is thence transferred to a roll (not shown) or to other converting operations.

The impression rollers 105 and 118, and the pressure roller 124 are preferably formed identically to the roller 15 shown in FIG. 2. Thus, the roller 105 presses into the laminated web an interconnected rectilinear network of compressed areas which have substantial amounts of binding liquid absorbed into them, while leaving the areas between the compressed areas substantially uncompressed and with only a light coating of binding liquid thereon if the surface of the gravure roler 106 is uniformly etched or engraved. No differential crepe is formed in the web as a result of the application of binding liquid by the combination of the gravure roller 106 and the impression roller 105.

A similar and superimposed interconnected rectilinear network of compressed areas is formed in the web by the action of the impression roller 118 against the surface of the gravure roller 119. In addition, the liquid picked up by the web from the gravure roller under the raised areas of the impression roller 118 results in a finer crepe at the pressed areas of the web when the web is creped off of the drier cylinder 125. The pressure roller 124 may be a patterned roller, in which case it will impress a pattern of interconnected grid lines into the web which will cause the areas of the web so compressed to be more tightly adhered to the surface of the drier than those areas which are not compressed. The resulting creped web has a denser and finer crepe at those areas which are pressed by the pressure roller 124 than at those areas which are not pressed. This differential creping pattern will be superimposed upon that caused by the differential in binding liquid pickup achieved at the nip between the rollers 118 and 119. Alternatively, the pressure roller 124 may be a smooth surfaced roller which applies only light, but uniform contact of the web to the drier surface, and therefore no differential crepe results from this pressure, although the laminated web will still exhibit a differential crepe resulting from the patterned application of binding liquid.

The above described processes and the apparatus for carrying them out are particularly adapted to produce a highly desirable laminated product from base substrates which have very low internal cohesion and very high initial bulkiness and water absorbency. For the most part, the generalization can be made that the lower the density and tensile strength of the initial base substrate webs, the better will be the bulk and absorbency of the final product. The laminated webs produced in accordance with the invention have the necessary tensile strength and surface cohesion added to them by the application of binding liquids in the manner described above. To achieve the tensile strength required, it is essential that the pattern of binding liquid and densified fibers within the laminated web be an interconnected lattice or network so that substantially uniform and adequate tensile strength is obtained within the finished product in the plane of the web. Thus, at least one, and preferably both of the impression rollers (or one and preferably both of the combined impression/pressure rollers) will have raised areas on their surfaces defining an interconnected network. These raised areas may define the geometric pattern shown in somewhat simplified form in FIG. 2, or they may be other geometric patterns which nonetheless provide an interconnected network, such as are shown in the aforementioned U.S. Pat. No. 4,125,659.

It is not necessary that the pressure rollers, which only function to press the web against the surface of the drier cylinders, have raised areas defining an interconnected network, although they may certainly have such raised areas if desired. As described above, these pressure rollers may simply be smooth surfaced rollers providing light contact, or they may have raised areas defining patterns which are not interconnected. The use of the latter type of pattern on the pressure roller will result in a pattern crepe in the final product defined by denser and finer crepes in the areas that were pressed by the raised areas of the pressure roller and coarser crepes or no crepes at all in those areas which were not so pressed. Thus, a variety of superimposed and aesthetically interesting creping patterns can be formed in the final product by the selection of the various surface patterns on the impression rollers and the pressure rollers.

Generally, the diamond-shaped raised patterns illustrated in FIG. 2 are preferred for use on the impression or impression/pressure rollers. Satisfactory results are obtained where the raised areas constitute 20% to 40% of the total area of the roller, with exemplary quadrangular shaped cells having their widest angles varying from 90° to 140°, and with the spacing between raised areas being approximately 3 to 12 mm.

It is understood that more than two plies can be combined in the processes described above. For example, three or more plies can be fed into the nip between gravure roller 14 and back-up roller 15 shown in FIG. 1, with corresponding adjustments being made in the pressure applied at the nip and in the amount of binding liquid required at the surface of the gravure roller for penetration through each of the webs to acheive proper lamination. Although the preferred position for initially combining the webs is shown in FIG. 1, it is also understood that the webs can be initially combined at other locations—for example, at the nip formed between the pressure roller 22 and the creping drum 25, on either side of the web that has been passed between the rollers 14 and 15, at the nip between the gravure roller 32 and back-up roller 33, at the line of contact between the rollers 29 or 30 and the web that is run continuously over them, or at the nip between the pressure roller 40 and the creping drum 43. Similarly, three or more webs could be combined at the nip between the gravure roller 74 and back-up roller 75 for the apparatus 70 shown in FIG. 3; the second or subsequent web could be alternatively inserted at the nip between the back-up roller 75 and the creping drum 76, at the line of contact between the supported web and the support rollers 84, 85, or 86; at the nip between the gravure roller 87 and the impression roller 88, or at the nip between the impression/pressure roller 88 and the creping drum 92. It is apparent that less bonding between plies will occur where one or more of the plies in the laminate receives only one application of binding liquid to it.

Figure 8:
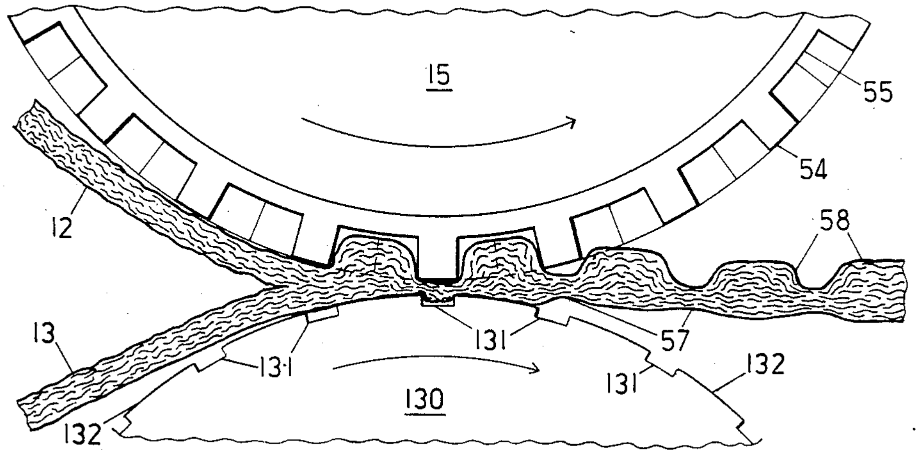
FIG. 8 is an illustrative view of the application of binding liquid to the web laminate in which the gravure roller has a pattern therein which registers with the raised pattern in the back-up or impression roller.

As an alternative to utilizing a uniform surfaced gravure roller which carries binding liquid over its entire surface, the gravure roller may have depressions which carry the binding liquid in a pattern. An example is shown in FIG. 8, in which the gravure roller 130 has grooves 131 which underlie the raised areas 54 on the impression roller 15. The surfaces areas 132 of the roller 15 between the grooves 131 are smooth and polished. The rollers 14 and 15 are mechanically driven together, such as with gearing (not shown), so that the raised areas 54 and the grooves 131 always remain in registry.

Figure 9:
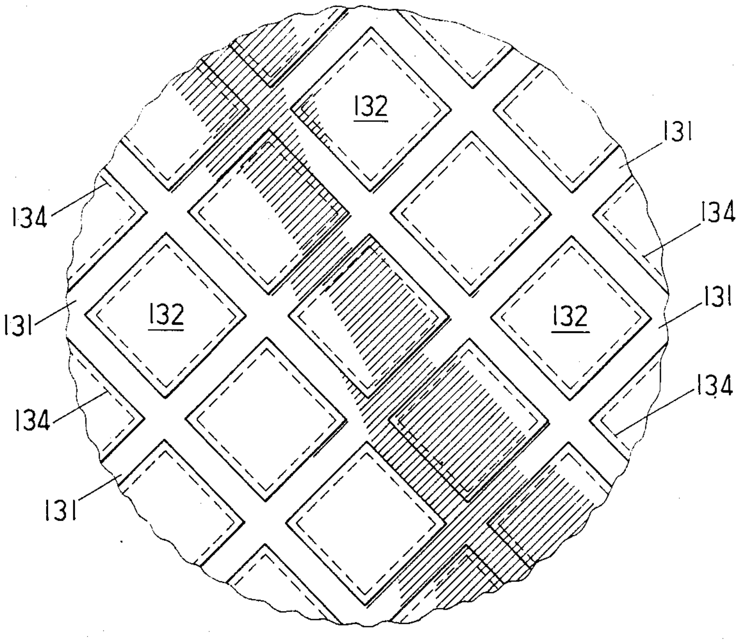
FIG. 9 is a plan view of a portion of the surface of a patterned gravure roller as in FIG. 8.

A portion of the surface of the gravure roller 130 is shown in FIG. 9. Preferably, the width of the raised areas 54 is slightly greater than the width of the etched grooves 131, so that the edges of the raised areas 54 lie over the smooth surface areas 132 of the gravure roller 130. The position at which the edges of the raised areas 54 meet the smooth areas 132 is illustrated by the dashed lines labeled 134 in FIG. 9. For example, with an impression roller having a 90° diamond pattern of raised areas defining squares 5.44 mm on a side, 0.762 raised area width, a satisfactory width for the etched grooves 131 is 0.635 mm. Typically, the grooves would be depressed approximately 0.0635 mm from the surface.

Figure 10:
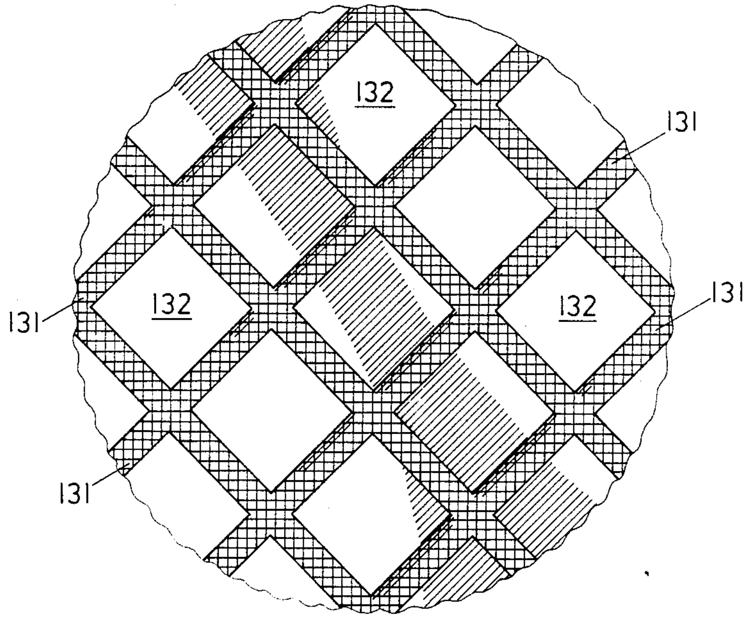
FIG. 10 is a plan view of a portion of the surface of another patterned gravure roller having etched cells defining the pattern.

The binder liquid applying areas 131 of the gravure roller may also be formed as discrete etched cells, rather than grooves, as shown in FIG. 10.

By utilizing a patterned gravure roller with the liquid applying areas 131 having a pattern matching and registering with the pattern of raised areas 54, the binding liquid is applied to the web laminate only in a rectilinear pattern of compressed areas having binding liquid therein. The areas of the web between the rectilinear pattern are uncompressed and free of binding liquid, thus retaining maximum softness and absorbency.

It may be noted that the patterned gravure roller as described immediately above may be used to apply binding liquid in any of the embodiments of the invention shown in FIGS. 1, 3 and 7.

The binding liquid utilized in the process of the invention must possess several qualities: it must be capable of providing adequate tensile strength in the finished product after curing, readily penetrating the fibers of the web so that bonding between plies takes place, and quickly drying and adhering the web to the creping cylinders for proper creping. Where a product having wet strength is desired, the binding liquid must also be capable of being cured to a water insoluble state. A preferred composition of the binding liquid is illustrated with reference to the example below.

EXAMPLE 1

Two 14.5 lbs. per ream (3,000 sq. ft.) substrates were provided for laminating, each of which had individual water holding capacity ratios (as defined below) of approximately 14 ml/g, a machine direction tensile strength of approximately 43 grams per centimeter, cross direction tensile strength of approximately 24 grams per centimeter, and a caliper for 8 plys of 1.27 mm under a compression of 26.6 g/cm$^2$. The binding liquid applied to the web comprised, as a percentage of the total weight of the binder liquid: 21.63% ethylene vinyl acetate (A-120 Latex, 52% solids), 2.16% acrylic polymer (B-85 Latex 38% solids), 1.3% poly vinyl alcohol (12% solids), to act as a thickener and generally improve rheology; 0.12% colloids (581-B) and 0.06% tri-n-butyl phosphate to act as defoaming agents, 0.65% Cymel 303 to act as a cross-linking agent, 0.22% $NaHSO_4$, to act as a catalyst to increase cross-linking; 0.22% $NH_4OH$ to adjust the pH of the binding liquid, and 73.83% water. The viscosity of the binding liquid as measured by a Brookfield RVF 100 Viscosimeter was 400 cps. at 24° C. and pH 6.4.

The binding liquid was applied to one side of the two webs using a uniform surfaced 120 lines per inch gravure cylinder having quadrangular knurled cells about 0.003 inch (0.0762 mm) deep. An impression roller was used having 35.7% raised surface area defining a 90° diamond pattern of cells having 0.214 inch (5.44 mm) machine direction length by 0.214 inch (5.44 mm) cross direction length and 0.03 inch (0.762 mm) raised surface band width. The two webs were fed through the gravure-impression roll nip which was set for approximately 0.002 inch (0.0508 mm) clearance, and binding liquid add on to the web laminate was found to be in the range of 3.4%, or about 1 lb. per ream. Due to wetting of the substrate at the gravure roller, a speed differential equivalent to 15% existed between the speed of the rollers at the gravure nip (54 ft. per minute) and the speed of the surface of the heated creping cylinder (62 ft. per minute). After application of the binding liquid to the web, the laminate comprised 85.8% oven dry solids.

A patterned pressure roller was used to press the laminated webs to the creping cylinder at a pressure loading of 132 pounds per linear inch at the nip between the pressure roll and the cylinder surface, which was heated to 200° F. The pressure roller was covered with a rubber sheet having a diamond pattern network with its raised surfaces covering 29.5% of the total area of the roller. The diamond pattern used had a 120° widest with a cell length along the machine direction of 0.414 inch (10.52 mm), a cell width of 0.289 inch (7.34 mm) along the cross direction, and a raised surface line width of 0.038 (0.965 mm) inch. The recessed areas were about 0.035 inch (0.889 mm) below the raised surface areas.

After adherence to the creping cylinder and substantial drying, the laminated webs were creped from the cylinder surface with a creping blade, thereby increasing the bulk, softness and absorbency of the laminated product. The web was rewound before being passed a second time through the same apparatus, rather than being directly passed to another gravure station as shown in FIG. 1. Therefore, the crepe imparted from the first pass was pulled out of the product at the wind-up roll to reduce the basis weight and bulk, thereby helping to decrease the amount of binding liquid added to the product in the second pass through. The crepe remaining in the product at this time was 5%, resulting from a speed differential of 62 ft. per minute at the creping drum surface and 59 ft. per minute at the wind-up roll.

The second pass through the apparatus was under essentially identical conditions as in the first pass but with the previously untreated side of the laminated web in contact with the gravure roller and the binding liquid. The speed differential between the gravure and impression rollers (67 ft. per minute) and the creping cylinder (77 ft. per minute) resulted in a speed reduction of approximately 15% to account for wetting of the webs. The amount of binder liquid added onto the web was 3% on the dry weight basis or 1 lb. per ream which wetted the entire laminated web to 87.5% oven dried solids. To maximize bulk and associated water holding capacity, the laminated web was creped from the creping drum at a 19% crepe obtained with a speed at the drum surface of 77 ft. per minute and at the wind up roll of 62 ft. per minute. The product was then passed at 100 ft. per minute through an eight foot long flotation drier held at 500° F., and was thereafter rewound into end product rolls having 100 11-inch by 11-inch sheets, or 85 sq. ft. total area.

The resulting product had a basis weight of 35.7 lbs. per ream, a caliper for 8 sheets of 0.185 inch (4.7 mm) under a compressive load of 26.6 $g/cm^2$, a dry geometric mean tensile strength of 135 grams per centimeter, a dry tensile ratio of 1.2, a wet cross direction tensile strength of 92 grams per centimeter, a water holding capacity total of 1005 grams per square meter, and a water holding capacity ratio of 17.7.

The water holding capacity test utilized to measure the characteristics of the laminated product is the test developed by J. A. Van den Akker which has been submitted for certification to the American Society for Testing Materials. This test may be briefly summarized as follows. At least five specimens, three inches by three inches on a side, are cut from the finished web. Each specimen is weighed and the weight recorded by itself and while on a metal specimen catcher plate. Each specimen is then laid upon back-up foamed plastic with the side to be laid in contact with the water facing up, and a row of hooks on a specimen holder is pushed through the specimen as it is supported on the foamed plastic. The specimen holder and specimen are then inverted and the specimen is laid on water held in a dish. A stop watch is started at the moment that the specimen contacts the water. After 59 seconds, the specimen is lifted from the water and laid on an excess water extractor formed of an aluminum plate with a series of slots milled in it to allow excess water to drain out. The elevation of the top surface of the excess water extractor above the pool of water is maintained at 5 mm, so that the specimen is subjected to a suction head of 5 mm of water. The specimen is left on the excess water extractor plate for 15 seconds, is then lifted and placed on the specimen catcher, the specimen holder is removed, and the combination of the specimen catcher and wet specimen is weighed and the weight recorded. The other specimens are tested in the same manner and another series of specimens may be tested to determine the water holding capacity of the other side of the web. The dry and wet specimen weights in grams are calculated by subtracting the known weight of the specimen catcher from the combined weights, calculating the dry basis weight of the specimens in grams per square meter, and calculating the amount of water held by the specimen, in grams, by subtracting the dry specimen weight from the wet specimen weight. The total water holding capacity is then calculated as the number of grams of water held per square meter by multiplying the water held by the specimen by 172. The water/fiber ratio or water holding capacity ratio is calculated by taking the ratio of the weight of the total water held to the dry specimen weight.

The resulting water holding capacity ratios for products formed in accordance with the present invention, as indicated in the example above, compare favorably with products formed by more expensive air laying and through-air-drying processes, which typically have water holding capacity ratios in the range of 13 to 17. In addition, the present product may have a uniform although light coating of wet strength bonding material on both of its surfaces, thereby making the product resistant to linting of fibers from the surface, a common problem with paper products which have had internal bonding between fibers decreased so as to increase the water holding capacity.

EXAMPLE 2

A satisfactory product can be produced in accordance with the present invention with a single patterned application of binding liquid and a single crepe. The bonding between plies will not be as strong as where binding liquid is applied from both sides, and one surface of the laminate will not have binding liquid applied thereto and will thus be somewhat vulnereable to linting of the fibers from the surface. For certain low stress toweling applications, such a product is acceptable; additionally, the present bonding processes can also be utilized on substrate webs which initially have substantial internal cohesion and surface integrity.

As an illustration of a single pass bonding process in acordance with the invention, two substrate webs were provided having respective characteristics as follows: basis weight, 15.0 pounds per ream (3,000 sq. ft.) and 14.4 pounds per ream; machine direction tensile strength, 47 grams per centimeter and 44 grams per centimeter; cross direction tensile strength, 28 grams per centimeter and 23 grams per centimeter; caliper for 8 plies under 26.6 grams per square centimeter load, 1.37 mm and 1.23 mm; and a water holding capacity ratio for each of approximately 14 ml/g. The binding liquid applied to the web was identical to that described above in Example 1 except that the pH of the liquid was 5.9 and the viscosity was measured as 440 cps.

The binding liquid was applied to one side of the two webs using an uniform surfaced 110 lines per inch gravure cylinder having quadrangular knurled cells about 0.0037 inch (0.094 mm) deep. An impression roller was used having 35.7% raised area defining a diamond pattern of cells having 0.214 inch (5.44 mm) machine direction length by 0.214 inch (5.44 mm) cross direction length and 0.03 inch (0.762 mm) raised surface band width. The two webs were fed through the gravure—impression roll nip which was set for 0.002 inch (0.0508 mm) clearance, and binding liquid add-on in the web laminate was found to be in the range of 4.9% or 1.3 pounds per ream. Due to wetting of the substrate at the gravure roller, a speed differential equivalent to 17% existed between the speed of the rollers at the gravure nip (66 ft. per minute) and the speed of the surface of the heated creping cylinder (77 ft. per minute). After application of the binding liquid to the web, the laminate comprised 83.7% oven dried solids.

The pattern pressure roller used to press the laminated webs to the creping cylinder applied 132 pounds per linear inch at the nip between the pressure roller and the cylinder surface, which was heated to 200° F. The pressure roller again was covered with a rubber sheet having a diamond pattern network with its raised surfaces covering 29.5% of the total area of the roller, with a diamond pattern having a 120 ° widest angle, a cell length along the machine direction of 0.414 inch (10.52 mm), a cell width of 0.219 inch (7.34 mm) along the cross direction, a raised surface line width of 0.038 inch (0.965 mm), and with the recessed areas being about 0.035 inch (0.889 mm) below the level of the raised surface areas.

After adherence to the creping cylinder and substantial drying, the laminated webs were creped from the rotating cylinder surface with a creping blade to thereby increase the bulk, softness and absorbency of the laminated product. The product was removed from the cylinder surface at a 13% crepe, a level selected to maximize bulk and associated water holding capacity, resulting from a speed differential existing between the cylinder surface (77 ft. per minute) and the wind-up roll (67 ft. per minute). The product was cured by passing it through an 8-foot flotation drier set at 500° F. with the product moving at a 100 ft. per minute. The product was then rewound into end product rolls having 100 11-inch by 11-inch sheets, or 85 square feet total area.

The resulting one-side pattern bonded and creped product had a basis weight of 33.6 pounds per ream, a caliper for 8 sheets of 0.158 inch (4.0 mm) under a compressive load of 26.6 g/cm$^2$, a dried geometric mean tensile strength of 142 grams per centimeter, a dry tensile ratio of 1.4, a wet cross direction tensile strength of 81 grams per centimeter, a water holding capacity total of 788 grams per square meter, and a water holding capacity ratio of 14.4.

It is understood that the invention is not confined to the particular embodiments disclosed herein as illustrated, but embraces such modified forms thereof as come within the scope of the following claims.

We claim:

1. A process for producing a laminated paper product from multiple substrate webs, comprising the steps of:

(a) passing at least two highly bulked, low strength fibrous substrate webs, each having low internal fiber bonding such that the creping of the substrate will tend to separate and fluff up the fibers, into a nip between a gravure roller and an impression roller to form a laminate of the webs, the impression roller having a resilient surface with raised areas defining an interconnected network and depressed areas between the raised areas such that the laminate of the webs is compressed under the raised areas of the impression roller and the remainder of the laminate is left substantially uncompressed, the height of the raised areas above the depressed areas selected to be greater than the uncompressed thickness of the substrate webs, the gravure roller having depressions which carry binding liquid in a pattern which underlies and registers with the raised areas on the impression roller such that binding liquid is absorbed substantially through the compressed areas of the laminate to bond together the substrate webs at these areas while the other areas of the laminate receive substantially no binding liquid;

(b) applying the laminate of the webs to a heated, moving, creping surface with a pressure roller having raised areas and depressed areas to define a pattern therein, the height of the raised areas above the depressed areas selected to be greater than the uncompressed thickness of the substrate webs, the laminate being compressed only by the raised areas of the pressure roller as it is applied to the creping surface and adhered thereto with the binding liquid coated side against the creping surface; and (c) creping the laminate by removing it from the creping surface with a creping blade such that the bulk of the laminate so creped is greater than the sum of the individual bulks of the substrate webs.

2. A process for producing a laminated paper product from multiple substrate webs, comprising the steps of:

(a) passing at least two highly bulked, low strength fibrous substrate webs, each having low internal fiber bonding such that creping of the substrate will tend to separate and fluff up the fibers, into a nip between a gravure roller and an impression roller to form a laminate of the webs, the gravure roller providing binding liquid on its surface to one side of the laminate and the impression roller having a resilient surface with raised areas defining an interconnected network and depressed areas between the raised areas such that the laminate of the webs is compressed under the raised areas of the impression roller and the remainder of the laminate is left substantially uncompressed, the height of the raised areas above the depressed areas selected to be greater than the uncompressed thickness of the substrate webs, the binding liquid on the surface of the gravure roller being absorbed substantially through the compressed areas of the laminate to bond together the substrate webs at these areas;

(b) applying the laminate of the webs to a heated, moving, creping surface with a pressure roller having raised areas and depressed areas to define a pattern therein, the height of the raised areas above the depressed areas selected to be greater than the uncompressed thickness of the substrate webs, the laminate being compressed only by the raised areas of the pressure roller as it is applied to the creping surface and adhered thereto with the binding liquid coated side against the creping surface; and (c) creping the laminate by removing it from the creping surface with a creping blade such that the bulk of the laminate so creped is greater than the sum of the individual bulks of the substrate webs.

3. A process of producing a laminated paper product from multiple substrate webs, comprising the steps of:

(a) passing at least two highly bulked, low atrength fibrous substrate webs, each having low internal fiber bonding such that creping of the substrate will tend to separate and fluff up the fibers, into a nip between a gravure roller and an impression roller to form a laminate of the webs, the gravure roller providing binding liquid on its surface to one side of the laminate, and the impression roller having a resilient surface with raised areas defining an interconnected network and depressed areas between the raised areas such that the laminate of the webs is compressed under the raised areas of the impression roller and the remainder of the laminate is left substantially uncompressed, the height of the raised areas above the depressed areas selected to be greater than the uncompressed thickness of the substrate webs, the binding liquid on the surface of the gravure roller being absorbed substantially through the compressed areas of the laminate to bond together the substrate webs at these areas;

(b) rotating the impression roller and maintaining the compressed and uncompressed areas of the laminate in respective registry with the raised and depressed areas on the impression roller as it rotates;

(c) passing the laminate on the impression roller into a nip formed between the impression roller and a moving, heated creping surface such that the raised areas of the impression roller press the once compressed areas of the laminate against the creping surface to adhere the laminate thereto with the binding liquid; and (d) creping the laminate by removing it from the creping surface with a creping blade such that the bulk of the laminate so creped is greater than the sum of the individual bulks of the substrate webs.

4. A process for producing a laminated paper product from multiple substrate webs, comprising the steps of:

(a) passing at least two highly bulked, low strength fibrous substrate webs, each having low internal fiber bonding such that the creping of the substrate will tend to separate and fluff up the fibers, into a nip between a gravure roller and an impression roller to form a laminate of the webs, the gravure roller providing binding liquid on its surface to one side of the laminate, and the impression roller having a resilient surface with raised areas defining an interconnected network and depressed areas between the raised areas such that the laminate of the webs is compressed under the raised areas of the impression roller and the remainder of the laminate is left substantially uncompressed, the height of the raised areas above the depressed areas selected to be greater than the uncompressed thickness of the substrate webs, the binding liquid on the surface of the gravure roller being absorbed substantially through the compressed areas of the laminate to bond together the substrate webs at these areas;

(b) passing heated air through the binding liquid coated laminate to substantially dry it;

(c) passing the dried laminate into a nip formed between a gravure roller and an impression roller, the gravure roller providing binding liquid on its surface to the side of the laminate opposite that to which binding liquid has previously been applied, and the impression roller having raised areas defining an interconnected network and depressed areas between the raised areas such that the laminate is compressed under the raised areas of the impression roller and the remainder of the laminate is left substantially uncompressed by the impression roller, the height of the raised areas above the depressed areas selected to be greater than the uncompressed thickness of the substrate webs, the binding liquid on the surface of the gravure roller being absorbed substantially through the compressed areas of the laminate to bond together the substrate at these areas;

(d) applying the laminate to a heated, moving creping surface with a pressure roller having raised areas and depressed areas to define a pattern therein, the height of the raised areas above the depressed areas selected to be greater than the uncompressed thickness of the substrate webs, the laminate being compressed only by the raised areas of the pressure roller with the binding liquid coated side of the laminate against the creping surface to cause the laminate to adhere thereto with the binding liquid; and (e) creping the laminate by removing it from the creping surface with a creping blade such that the bulk of the laminate so creped is greater than the sum of the individual bulks of the substrate webs.

5. The process of claim 2 further including the steps of:

(1) passing the creped laminate into a nip between a second gravure roller and a second impression roller, the second gravure roller providing binding liquid on its surface to the side of the laminate opposite that to which binding liquid had previously been applied, and the second impression roller having a resilient surface with raised areas defining an interconnected network and depressed areas between the raised areas such that the laminate is compressed under the raised areas of the second impression roller and the remainder of the laminate is left substantially uncompressed by the second impression roller, the height of the raised areas above the depressed areas selected to be greater than the uncompressed thickness of the substrate webs, the binding liquid on the surface of the second gravure roller being absorbed substantially through the areas of the laminate compressed by the second impression roller to bond together the susbstrate webs at these areas;

(2) applying the laminate to a heated, moving creping surface with pressure applied by a pressure roller having raised areas and depressed areas to defind a pattern therein, the height of the raised areas above the depressed areas selected to be greater than the uncompressed thickness of the substrate webs, the laminate being compressed only by the raised areas of the pressure roller with the binding liquid coated side of the laminate against the creping surface to cause the laminate to adhere thereto with the binding liquid; and (3) creping the laminate by removing it from the creping surface with a creping blade such that the bulk of the laminate so creped is greater than the sum of the individual bulks of the substrate webs.

6. The process of claim 3 further including the steps of:

(1) passing the creped laminate into a nip between a second gravure roller and a second impression roller, the second impression roller providing binding liquid on its surface to the side of the laminate opposite that to which binding liquid had previously been applied, and the second impression roller having a resilient surface with raised areas defining an interconnected network and depressed areas between the raised areas such that the laminate is compressed under the raised areas of the second impression roller and the remainder of the laminate is left substantially uncompressed by the second impression roller, the height of the raised areas above the depressed areas selected to be greater than the uncompressed thickness of the substrate webs, the binding liquid on the surface of the second gravure roller being absorbed substantially through the areas of the laminate compressed by the second impression roller to bond together the substrate webs at these areas;

(2) rotating the second impression roller and maintaining the compressed and uncompressed areas of the laminate in respective registry with the raised and depressed areas on the second impression roller as it rotates;

(3) passing the laminate on the second impression roller into a nip formed between the second impression roller and a moving, heated creping surface such that the raised areas of the second impression roller press the once compressed areas of the laminate against the creping surface to adhere the laminate thereto with the binding liquid; and (4) creping the laminate by removing it from the creping surface with a creping blade such that the bulk of the laminate so creped is greater than the sum of the individual bulks of the substrate webs.

7. The process of claim 2, 3 or 4 wherein the raised area of the impression roller is between 20% and 40% of the total area of the surface of the roller.

8. The process of claim 1, 2, 3 or 4 wherein the binding liquid is capable of being cured to a hardened and insoluble state, and further including the step of curing the binding liquid in the creped laminate to thereby provide lines of strength in the laminate corresponding to the interconnected networks of cured binding liquid in the laminate.

9. The process of claim 5 or 6 wherein the binding liquid is capable of being cured to a hardened and insoluble state, and further including the step of curing the binding liquid in the creped web laminate to thereby provide lines of strength in the web laminate corresponding to the interconnected networks of cured binding liquid in the laminate.

10. The process of claim 8 wherein the binding liquid is heat curable, and wherein the step of curing the binding liquid comprises applying hot air to the creped web laminate for a time sufficient to cure the binding liquid.

11. The process of claim 10 wherein the binding liquid includes a mixture of ethylene vinyl acetate polymer and acrylic polymer.

12. The process of claim 9 wherein the binding liquid is heat curable to a hardened and insoluble state, and wherein the step of curing the binder liquid comprises applying hot air to the creped laminate for a time sufficient to cure the binding liquid.

13. The process of claim 12 wherein the binding liquid includes a mixture of ethylene vinyl acetate polymer and acrylic polymer.

14. The process of claim 2, 3 or 4 wherein the raised areas on the impression roller define a rectilinear network pattern which surround depressed areas having a quadrangular shape.

15. The process of claim 1 wherein the interconnected network of areas compressed in the laminate defines a rectilinear network pattern.

16. The process of claim 1, 2, 4 or 5 wherein the step of applying the laminate to the creping surface includes passing the laminate having a coating of binding liquid thereon into a nip between a pressure roller and the moving creping surface.

17. The process of claim 16 wherein the pressure roller has raised areas and depressed areas to define a pattern therein, with the web laminate being compressed by the raised areas of the pressure roller.

18. The process of claim 1 wherein the surface with binding liquid thereon has binding liquid uniformly distributed over it.

19. The process of claim 1 wherein the surface with binding liquid thereon has the binding liquid in a pattern which matches and registers with the pattern in which the laminate is pressed against the surface.

20. The process of claim 2, 3, 4, 5 or 6 in which each gravure roller has a uniform surface composed of cells acting as reservoirs for binding liquid, the binding liquid being absorbed substantially through the areas of the laminate which are compressed against each gravure roller, and coated on the surface of the areas of the laminate which are not so compressed.

21. The process of claim 2, 3, 4, 5 or 6 in which each gravure roller has depressions on its surface acting as reservoirs for binding liquid and arranged in a pattern which matches and registers with the raised areas of the impression roller which presses the laminate against the gravure roller, the areas of the gravure roller between the pattern areas being smooth so as not to pick up binding liquid, such that the binding liquid is substantially absorbed through those areas of the laminate which are compressed against the gravure roller while the remainder of the laminate receives no binding liquid from the gravure roller.

22. A process for producing a laminated paper product from multiple substrate webs, comprising the steps of:

(a) passing at least two highly bulked, low strength fibrous substrate webs, each having low internal fiber bonding such that creping of the substrate will tend to separate and fluff up the fibers, into a nip between a gravure roller and an impression roller to form a laminate of the webs, the gravure roller providing binding liquid on its surface to one side of the laminate, and the impression roller having a resilient surface with raised areas defining an interconnected network and depressed areas between the reaised areas such that the laminate of the webs is compressed under the raised areas of the impression roller and the remainder of the laminate is left substantially uncompressed, the height of the raised areas above the depressed areas selected to be greater than the uncompressed thickness of the substrate webs, the binding liquid on the surface of the gravure roller being absorbed substantially through the compressed areas of the laminate to bond together the substrate webs at these areas;

(b) rotating the impression roller and maintaining the compressed and uncompressed areas of the laminate in respective registry with the raised and depressed areas on the impression roller as it rotates;

(c) passing the laminate on the impression roller and another substrate web into a nip formed between the impression roller and a moving, heated creping surface such that the raised areas of the impression roller press the once compressed areas of the laminate against the additional substrate web and the creping surface to cause the binding liquid to migrate into the additonal substrate web and bond together the substrate webs at these areas, and adhering the laminate with the additional substrate to the creping surface with a creping adhesive; and (d) creping the laminate by removing it from the creping surface with a creping blade such that the bulk of the laminate so creped is greater than the sum of the individual bulks of the substrate webs.

* * * * *

UNITED STATES PATENT AND TRADEMARK OFFICE

CERTIFICATE OF CORRECTION

PATENT NO. : 4,610,743

DATED : September 9, 1986

INVENTOR(S) : Nilo I. Salmeen and Bernard G. Klowak

It is certified that error appears in the above-identified patent and that said Letters Patent are hereby corrected as shown below:

In The Abstract:

Line 32, "outer" should read --other--.

Line 33, "the" should read --and--.

In The Specification:

Column 14, lines 42 and 43, insert between "widest" and "with" --angle--.

Column 16, line 46, insert between "a" and "diamond" --$90^{\circ}$--.

In The Claims:

Claim 3, column 18, line 45, "atrength" should read --strength--.

Signed and Sealed this

Eleventh Day of November, 1986

*Attest:*

DONALD J. QUIGG

*Attesting Officer* *Commissioner of Patents and Trademarks*